No. 757,400. PATENTED APR. 12, 1904.
E. GUELFF.
KITCHEN CABINET.
APPLICATION FILED DEC. 16, 1901.
NO MODEL.
3 SHEETS—SHEET 2.
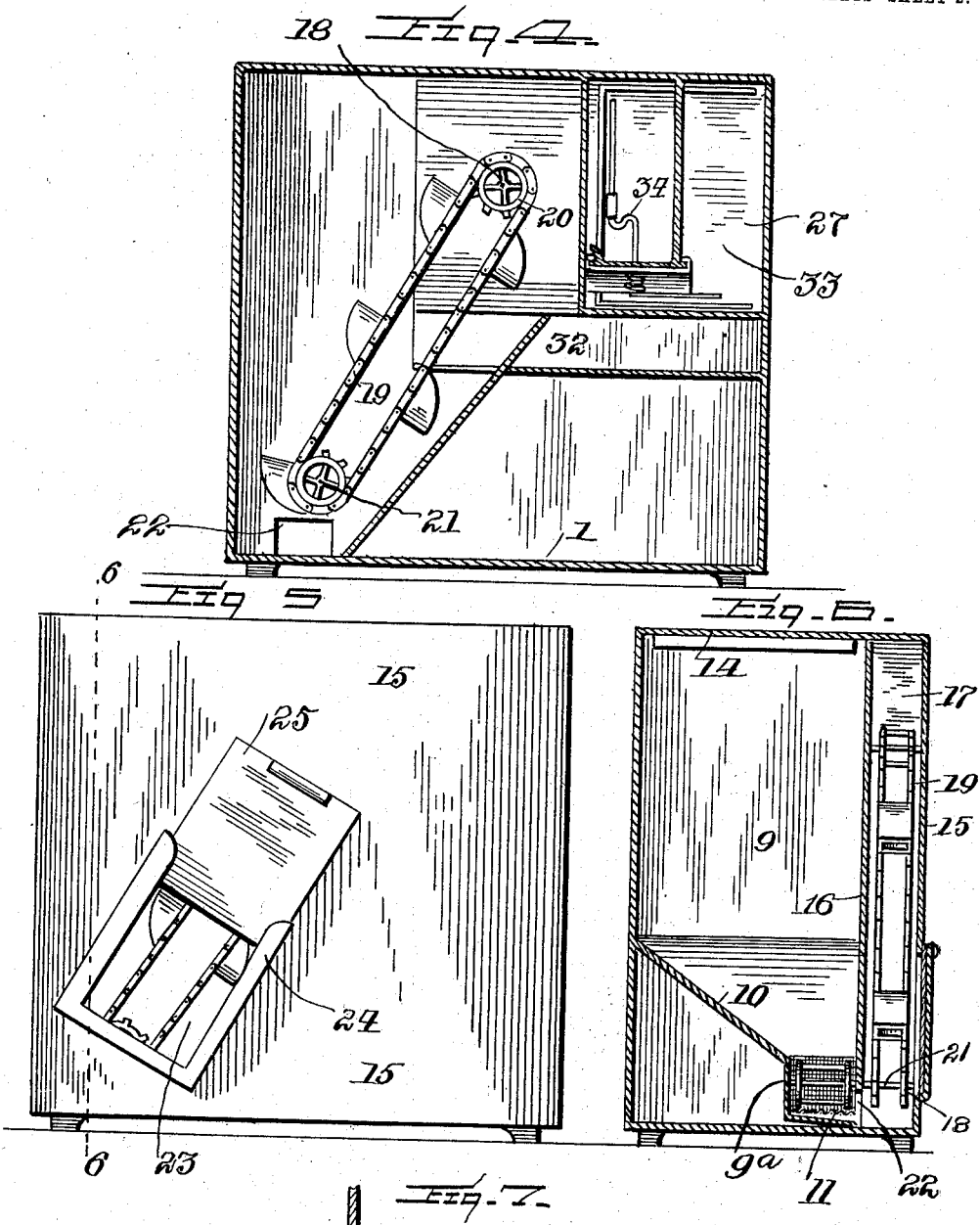
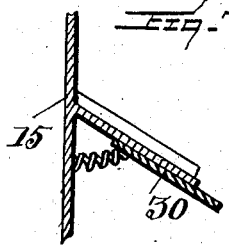
Witnesses:
Inventor
Elisee Guelff.
By Attorneys.

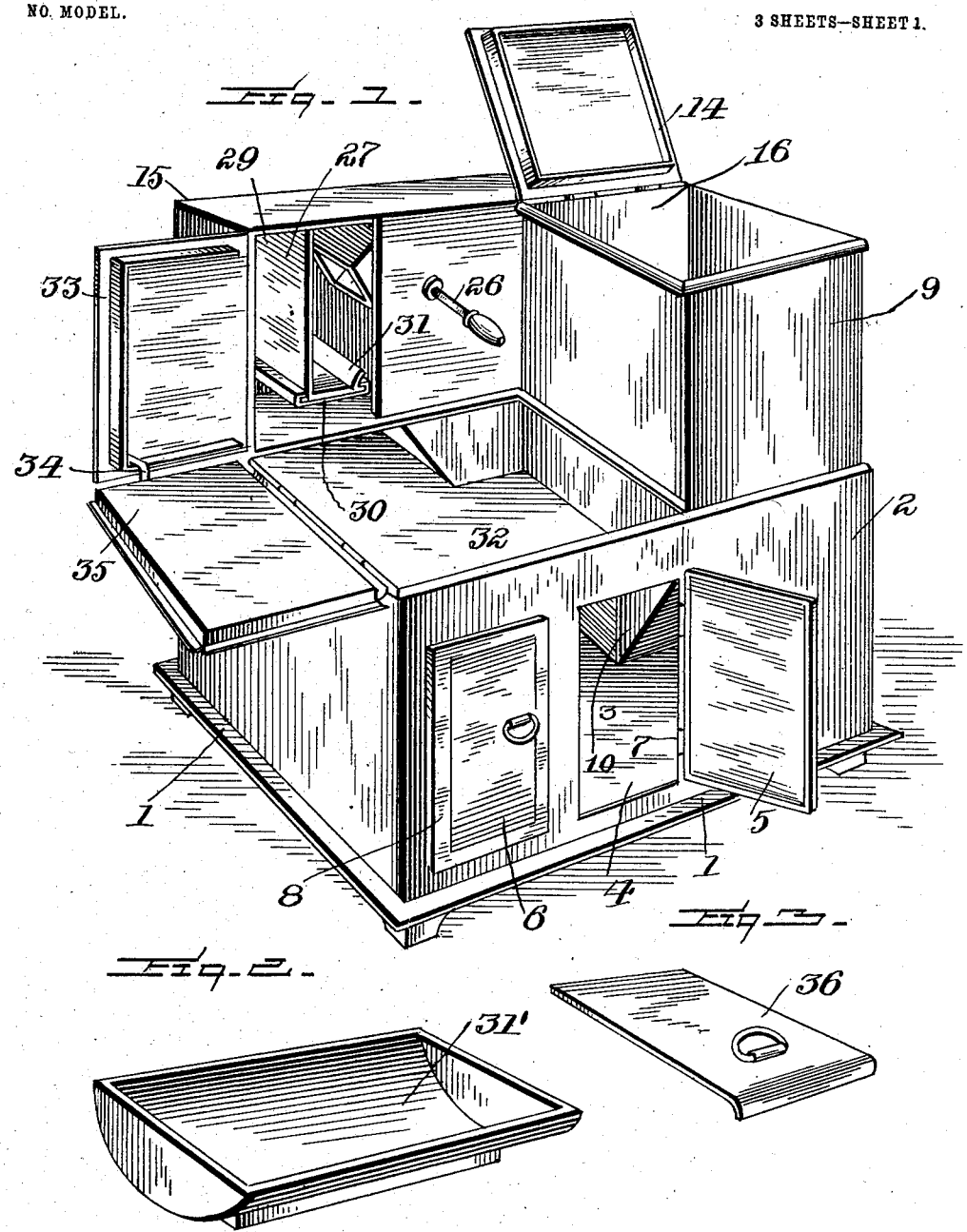

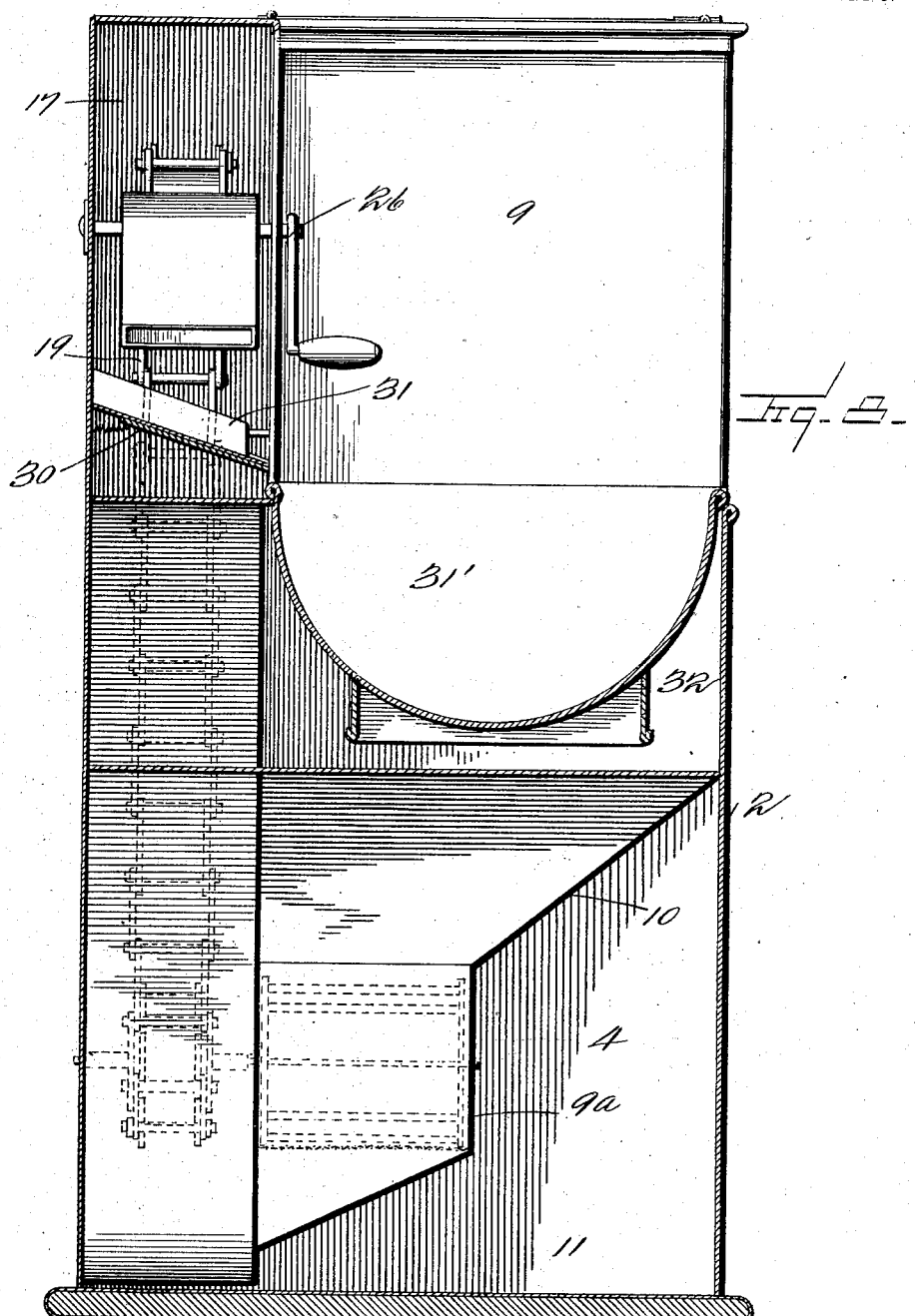

No. 757,400.

Patented April 12, 1904.

UNITED STATES PATENT OFFICE.

ELISÉE GUELFF, OF HAZELHURST, PENNSYLVANIA.

KITCHEN-CABINET.

SPECIFICATION forming part of Letters Patent No. 757,400, dated April 12, 1904.

Application filed December 16, 1901. Serial No. 86,156. (No model.)

*To all whom it may concern:*

Be it known that I, ELISÉE GUELFF, a subject of the King of Belgium, residing at Hazelhurst, in the county of McKean and State of Pennsylvania, have invented certain new and useful Improvements in Kitchen-Cabinets, of which the following is a specification, reference being had therein to the accompanying drawings.

This invention relates to certain new and useful improvements in kitchen-cabinets, and has for its object the provision of novel means whereby various compartments are formed to accommodate articles and provisions that are used in the kitchen.

The present invention has for its further object the provision of a kitchen-cabinet with a novel form of flour-bin that will first sift the flour, then convey it to an endless conveyer that will lift the flour to the desired height, where it will be conveyed from the adjustable chute into the kneading-pan, the latter being conveniently arranged upon the table of the cabinet.

The invention has for its further object the provision of a kitchen-cabinet that will be extremely simple in construction, strong, durable, and comparatively inexpensive to manufacture; furthermore, one that will be highly efficient in its use.

With the above objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a perspective view of my improved kitchen-cabinet with the kneading-pan removed therefrom. Fig. 2 is a perspective view of the kneading-pan. Fig. 3 is a perspective view of the removable cover for the kneading-pan. Fig. 4 is a vertical sectional view illustrating the endless conveyer. Fig. 5 is a rear elevation of the cabinet. Fig. 6 is a vertical sectional view taken on the line 6 6 of Fig. 5. Fig. 7 is a detail sectional view of the slide forming the chute. Fig. 8 is a vertical sectional view on the line $x\ x$ of Fig. 4 looking toward the end of the cabinet.

In the drawings the reference-numeral 1 represents a suitable base, upon which is mounted the body portion 2 of the cabinet, said body portion 2 forming the inner receptacle 3, in which may be stored the provisions or utensils, said body portion 2 having openings 4 formed therein, to which are secured hinged doors 5 and 6, the door 5 being hinged at 7 and the door 6 being preferably hinged at 8. Within the body portion 2 is formed the flour-bin 9, said flour-bin having an inclined bottom formed with a casing $9^a$, in which is arranged at the bottom thereof the flour-sifter 11. The upper end of the bin 9 is provided with a hinged lid 14.

The reference-numeral 15 represents the rear wall of the cabinet, which extends a considerable distance above the body portion or casing 2 to a point upwardly upon a plane with the top of the flour-bin. The flour-bin 9 is also provided with an inner wall 16, which extends upwardly parallel to the rear wall 15 and forms the compartment 17 therebetween. In said compartment is secured upon wheels 18 the endless conveyer 19, the shaft 20 of said wheels extending between the walls 15 and 16, and the lower shaft 21 extending through the wall 16 and carries an agitator arranged above the sifter 11. At the lower end of the wall 16 is formed an opening 22 for the purpose of conveying the flour from the sifter into the endless conveyer.

The reference-numeral 23 represents an opening formed in the rear wall of the cabinet, the edges of said opening being provided with guides 24 for the reception of the slide-door 25 in order to give access to the endless conveyer in case the latter should become clogged. The endless conveyer is composed of a sprocket-chain operating over the sprocket-wheels 18, said chain carrying the usual receptacles forming the conveyer.

The reference-numeral 26 represents a crank-handle secured to the shaft 20, serving to operate the conveyer, and 27 indicates a compartment between the walls 15 and 16, in which there is arranged the partition 29, at the lower end of which is secured the spring-pressed chute 30, operating in the guide 31, upon which is delivered the flour from the conveyer, and from said chute the flour is conveyed into the kneading-pan 31', which kneading-pan is secured upon the table 32, upon which it rests.

The reference-numeral 33 represents a hinged door for the compartment 27, said hinged door carrying a support 34 for the hinged cover 35, the latter covering a portion of the kneading-pan. The other portion of the said kneading-pan is covered by the removable lid 36.

My improved kitchen-cabinet may be made of any suitable material, but is preferably made of tin or other sheet metal.

The many advantages obtained by the use of my improved device will be readily apparent from the foregoing description, taken in connection with the accompanying drawings.

The operation of my improvement is as follows: The bin being filled with flour or the like, the crank 26 is turned, thus operating the agitator of the sifter 11 and causing the sifted material to pass into the compartment 17, where it is scooped and conveyed by the cups on the endless conveyer and dumped upon the inclined guide 31, from which it will fall into the kneading-pan 31'. By providing the spring-pressed chute the same will normally project outwardly, so as to convey the flour into the pan. The door 33 when closed forces the said chute inward.

The support 34 is slidably mounted in the bracket 34' and has its lower end bent at an angle, whereby when it is swung outwardly, as illustrated in Fig. 1 of the drawings, its lower end will support the hinged cover 35.

Having fully described my invention, what I claim as new, and desire to secure by Letters Patent, is—

1. In a kitchen-cabinet, the combination of a flour-bin, partitions arranged in the rear of said bin and forming a compartment, an endless conveyer arranged in said compartment, an inclined guide arranged within said compartment below the upper end and transversely of the conveyer, a chute slidably mounted on said guide and adapted when extended to project beyond said compartment an opening in front of said guide and chute, a door adapted to close said opening, a kneading-pan arranged laterally of the conveyer and in front of the said guide and chute and a lid for said pan, said lid when closed being below the end of said chute, whereby when the chute is in its extended position flour may be delivered into said pan or upon said lid.

2. The combination with the body portion of the cabinet, a pan arranged in the top thereof, a cover hinged to one side of the said pan, a bin projecting above the said pan, a pair of partitions arranged in the rear of the said pan and forming a compartment, an endless conveyer mounted in the said compartment and projecting above the said pan, a sifting mechanism operated by the said conveying mechanism, means for operating the said conveyer, a guide to receive the material from the conveyer, a spring-pressed chute slidably mounted on the said guide, one of said partitions being formed with an opening in front of the said chute, a door closing the said opening, and means carried by the said door for supporting the said cover when in an open position.

In testimony whereof I affix my signature in the presence of two witnesses.

ELISÉE GUELFF.

Witnesses:
 EMILE LAURENT,
 G. P. HOFMANN.